United States Patent [19]
Delaney et al.

[11] 3,713,502
[45] Jan. 30, 1973

[54] DUAL POWERED VEHICLE

[75] Inventors: John J. Delaney, West Pittston, Pa.;
Henry O. Gervais, Mountaintop, Pa.

[73] Assignee: Northeastern Pennsylvania Research and Development Co., Inc., Pittston, Pa.

[22] Filed: Sept. 3, 1969

[21] Appl. No.: 854,897

[52] U.S. Cl............................180/27, 180/65 R
[51] Int. Cl................................B62k 11/00
[58] Field of Search..............180/27, 34, 33, 65, 25;
280/36 M, 6 C, 261

[56] References Cited

UNITED STATES PATENTS

| D178,341 | 7/1956 | Dacus | 280/36 UX |
|---|---|---|---|
| 1,309,305 | 7/1919 | Scheiner | 180/27 |
| 2,224,411 | 12/1940 | Smith | 180/65 UX |
| 2,633,030 | 3/1953 | Colden | 180/27 UX |
| 2,815,222 | 12/1957 | Harrison | 280/261 |
| 2,973,048 | 2/1961 | Jensen | 280/36 UX |
| 3,042,131 | 7/1962 | Dorci | 180/27 |
| 3,094,187 | 6/1963 | Horowitz | 180/27 |
| 3,219,137 | 11/1965 | Appleton | 180/65 X |
| 3,466,059 | 9/1969 | Kiernan | 280/261 |
| 3,598,195 | 8/1971 | Steller | 180/65 |

FOREIGN PATENTS OR APPLICATIONS

| 869,287 | 7/1941 | France | 180/34 |
|---|---|---|---|
| 443,948 | 2/1968 | Switzerland | 180/25 |

*Primary Examiner*—Kenneth H. Betts
*Attorney*—Gardner J. O'Boyle and James G. O'Boyle

[57] ABSTRACT

Drive arrangement for vehicles of the character employed to transport personnel and equipment, for example, golf cart or an industrial vehicle for transporting personnel and supplies between and throughout industrial plant areas, or the like, said vehicles having a dual power system comprising a battery operated electric motor and pedalling assembly, the motor and pedalling assembly being adapted to operate conjointly as a source of power, or as independent power sources, at the option of the user.

8 Claims, 7 Drawing Figures

INVENTORS
JOHN J. DELANEY &
HENRY O. GERVAIS

ATTORNEYS

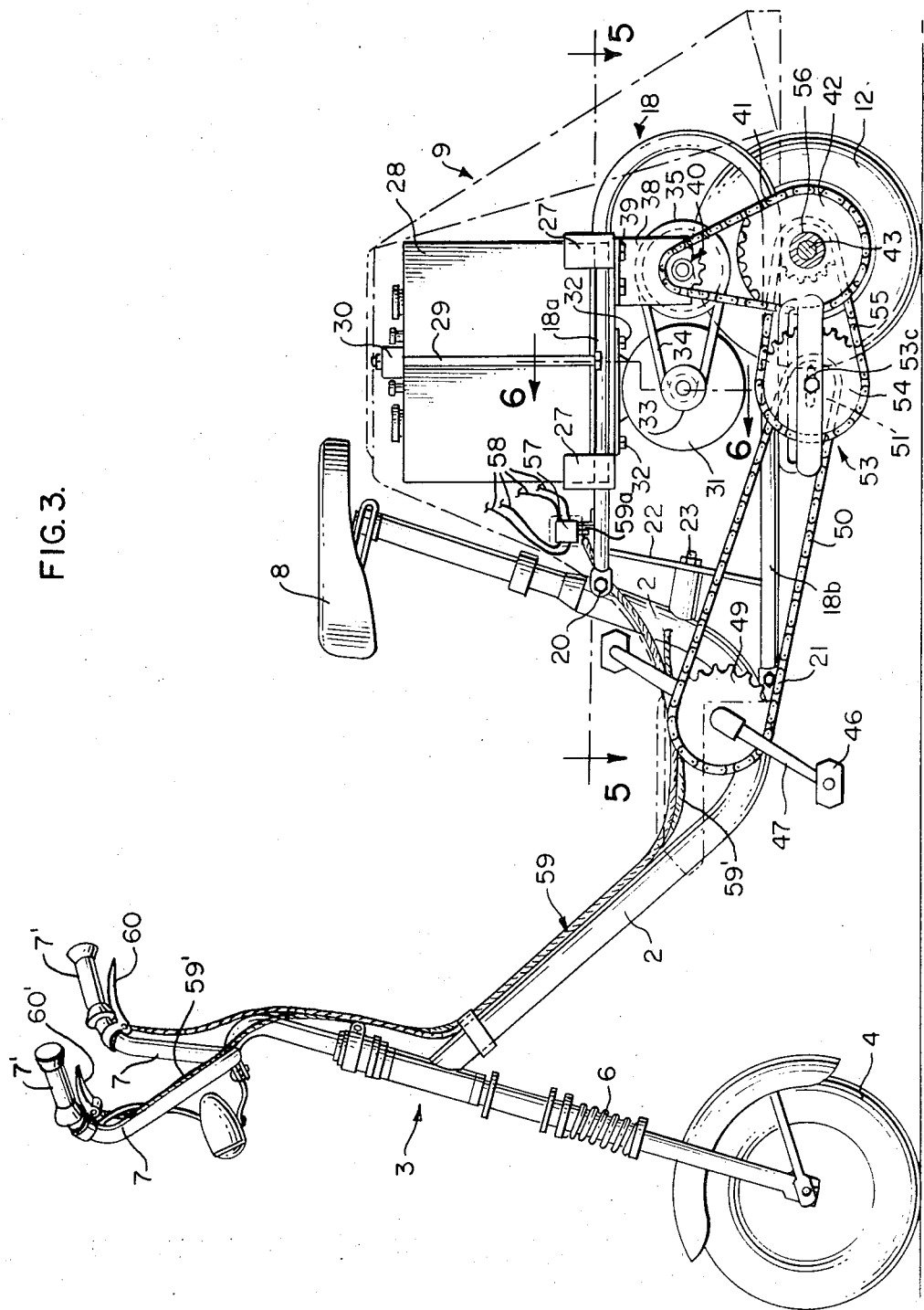

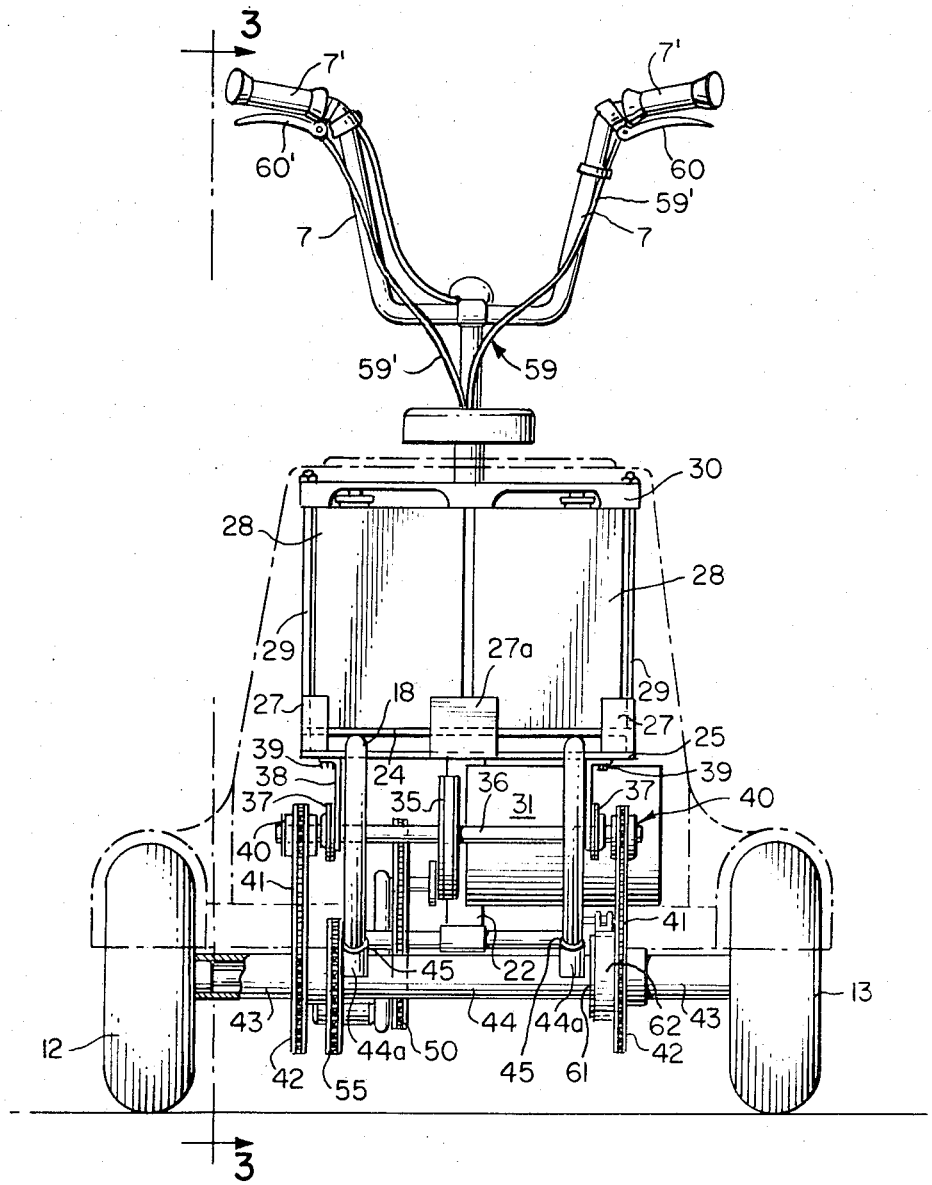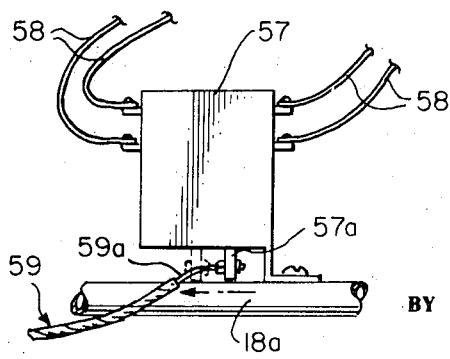

INVENTORS
JOHN J. DELANEY &
HENRY O. GERVAIS

BY

ATTORNEYS 3,713,502

DUAL POWERED VEHICLE

BACKGROUND OF THE INVENTION

Heretofore, it has been suggested to provide electric drive means for bicycles and three-wheeled vehicles comprising a battery operated motor or a motor operated by an electric generator driven by the pedalling means. The drive assembly for propelling the vehicles is adapted to drive one of the wheels, either the steerable wheel or a wheel keyed to the rear axle, the opposite rear wheel, if the vehicle is three-wheeled, being freely rotatable; the pedalling means associated with the prior electric driven bicycles being used to propel the bicycle, in the event of failure of the power source.

While the heretofore suggested electric drive means of the above-noted types no doubt function for their intended purposes, they are open to objection due to their inherent design. It has been found, for example, that when the vehicle is operated in accordance with a daily schedule involving stop and go driving, the battery life between successive recharges is relatively short, and that the delay encountered incident to recharging the battery not only interrupts the normal operating schedule, but it is also a source of inconvenience to those who depend upon maintenance of regular service for the delivery of supplies and for transportation. Additionally, a contributing factor to reduction of battery life between recharges is the use of resistors or rheostats and solenoids in the electrical system of the prior art arrangements for controlling the speed of the vehicle.

SUMMARY OF THE INVENTION

After considerable research and experimentation, we have found that the operating efficiency of the vehicle is substantially improved by employing a dual power system, wherein a battery operated electric motor and pedalling means are constructed and arranged to function conjointly as a power source, or as independent power sources, at the option of the user. More particularly, we have found that conservation of the battery energy by the pedalling means is, in effect, an indirect method of putting back, so to speak, a percentage of the electrical energy being dissipated while the vehicle is in motion, without employing an electrical generator or other means, to restore the percentage of energy being dissipated. By eliminating the resistors or rheostats and solenoids, normally employed in the electrical system, and using the pedalling means when starting the vehicle and periodically during the operation thereof, the demand on the battery is substantially reduced with concomitant increased life between successive recharges.

Not only is the operating efficiency of the vehicle improved by the dual power system of the present invention; but also when used as a golf cart, the player will enjoy a certain amount of exercise by pedalling to propel the vehicle conjointly with the electric motor. The amount of exercise obtained by the player will be less strenuous than it would be if the pedalling was the sole source of propulsion, but more strenuous than when the electric motor is the sole source of propulsion as is customary in conventional golf carts.

DESCRIPTION OF THE DRAWINGS

FIG. 3 is a side elevational view of the vehicle showing the details of the dual power system;

FIG. 4 is a rear elevational view of the vehicle;

FIG. 7 is an enlarged view of the switch employed to control the current from the battery to the electric motor.

Figure 1:
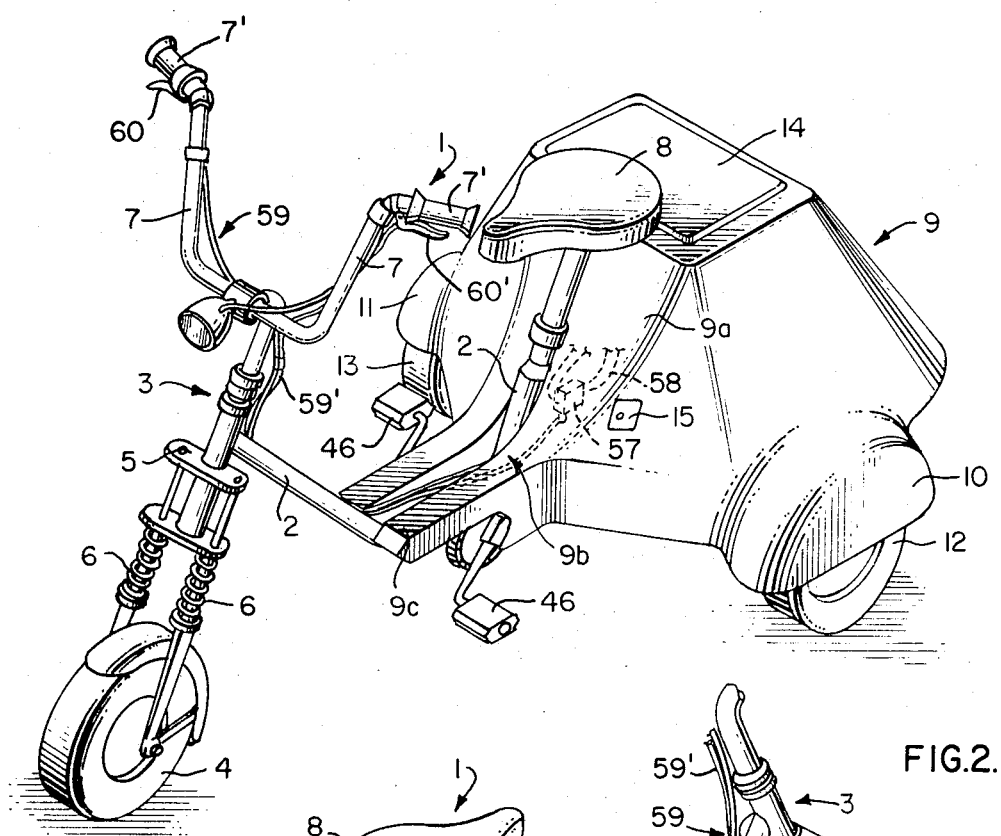
FIG. 1 is a perspective view of one side of the vehicle of the present invention.
Figure 2:
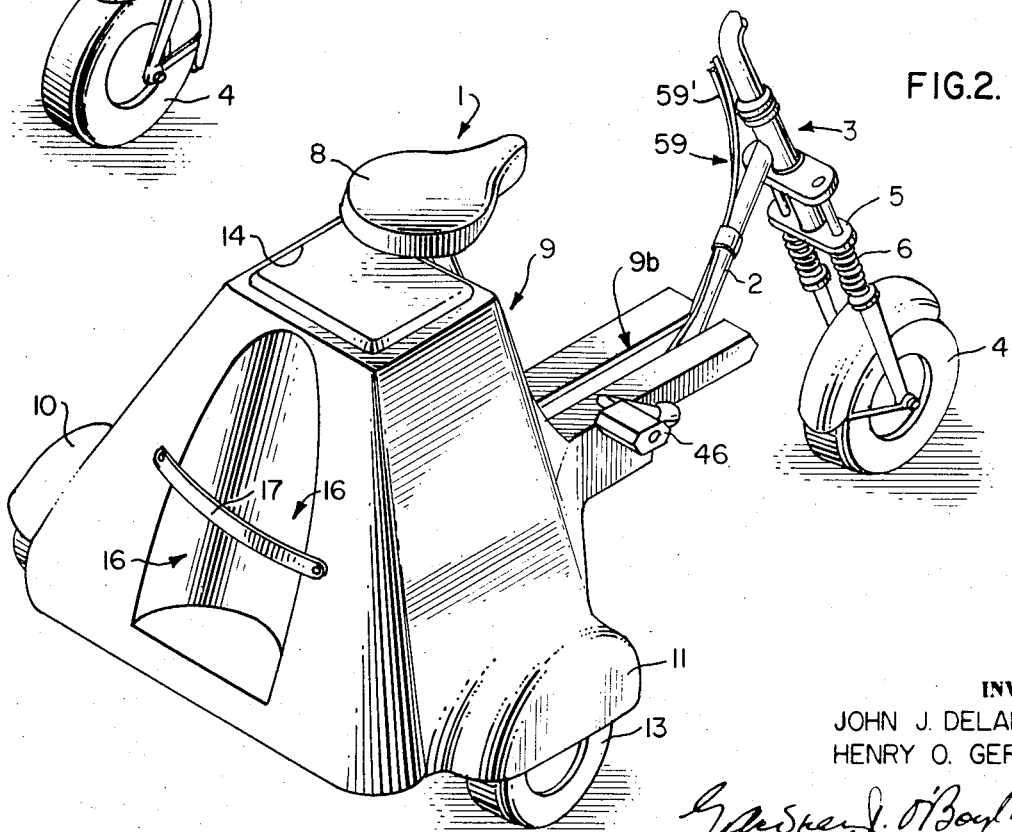
FIG. 2 is a perspective view of the opposite side of the vehicle shown in FIG. 1.

Referring to the drawings and more particularly to FIGS. 1 and 2, the vehicle of the present invention comprises a three-wheeled cart 1 including a conventional tubular frame 2 which supports a steering column 3 connected to the front wheel 4 through a forked frame 5 having a spring suspension 6, the upper end of the steering column having handle bars 7, incorporating grip members 7', secured thereto. A seat 8 is also supported on the frame 2 in such fashion that its position relative to the frame and handle bars may be adjusted to suit the driver of the vehicle. The rear of the vehicle is provided with a truncated housing 9 for covering the propulsion system, to be described more fully hereinafter. The housing 9 includes fender portions 10 and 11 for the vehicle rear walls 12 and 13, respectively; the housing front wall 9a flaring forwardly to form a bifurcated portion 9b, the bight of the bifurcated portion accommodating the portion of frame 2 which supports the seat, the legs 9c of the bifurcated portion forming horizontal support surfaces for the feet of the driver. The top and side walls of the housing are provided with removable cover plates 14 and 15, respectively, for affording access to the vehicle propulsion system to thereby preclude the necessity of removing the entire housing for purposes of inspection or to perform maintenance on the propulsion system. As will be seen in FIG. 2, the rear wall of the housing is provided with a recessed portion 16 for receiving articles to be transported. In the vehicle illustrated, the recessed portion is adapted to accommodate a golf bag; thus, a strap 17 is provided to hold the bag in the recess. While, for purposes of illustration, the vehicle has been described for use as a golf cart, it will be appreciated by those skilled in the art that other types of containers, such as baskets or tote boxes, may be provided on the housing, whereby the vehicle may be used to transport supplies between and throughout industrial plant areas.

FIGS. 3 to 6, inclusive, show the details of the propulsion system and its supporting structure which comprises a pair of tubular frame members 18 and 19, each of which is bent back upon itself to form a pair of upper, spaced, parallel leg portions 18a and 19a, and a corresponding pair of lower leg portions 18b and 19b. As will be seen in FIG. 5, the corresponding end portions of the legs converge toward each other and are secured to the frame by suitable bolts 20 and 21, and in order to insure that the upper and lower leg portions 18a, 18b, 19a and 19b are maintained in spaced relationship, a strut 22, FIG. 3, is provided between said upper and lower leg portions, and secured to the vehicle frame 2 as at 23.

Figure 6:
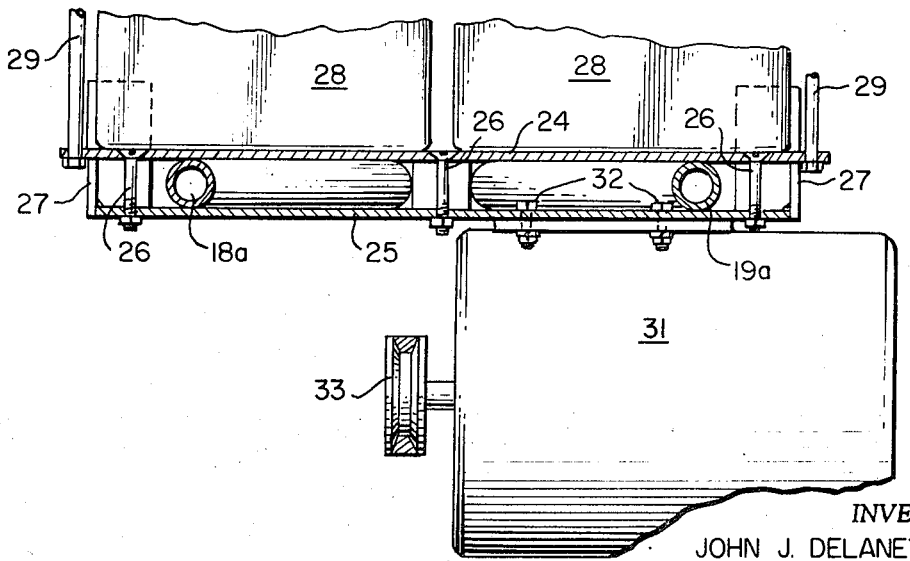
FIG. 6 is a view taken along line 6—6 of FIG. 3.

Referring to FIG. 6, the upper leg portions 18a and 19a are interposed between a pair of upper and lower plates 24 and 25, respectively, the plates being held rigidly against the leg portions by bolts 26. The corners of lower plate 25 have upwardly extending angle brackets 27 welded thereto to provide corner seats for a pair of batteries 28 supported by the upper plate 24. As will be seen in FIG. 4, additional brackets 27a may be welded along the edge of plate 25 intermediate the corners thereof to enhance the seating of the batteries on plate 24, the batteries being rigidly held on the plate by a pair of tie bolts 29 extending vertically from the lateral edges of the plate, to a transversely extending yoke member 30 seated on the upper surface of the batteries.

The batteries 28 are electrically connected to a motor 31 depending from and secured to the lower plate 25 by bolts 32 (FIG. 6). A pulley 33 is secured to the motor drive shaft 31' for driving a belt 34, FIG. 5, which in turn, drives a pulley 35 secured to a transversely extending shaft 36. The outer end portions of shaft 36 are journaled in suitable bearings 37 mounted in depending support brackets 38 which are secured to the plate 25 by means of bolts 39. It will be appreciated by those skilled in the art that the apertures in plate 25, through which the motor mounting bolts 32 extend, FIGS. 3 and 4, are elongated, whereby the motor 31 may be moved relative to the driven pulley 35 for adjusting the tension of drive belt 34. Each end of the shaft 36 has a sprocket and clutch assembly 40 secured thereto for driving a respective chain 41, which in turn, drive sprockets 42 secured to the inner ends of the vehicle tubular rear axles 43 having their outer ends secured to the wheels 12, whereby the tubular axles 43 rotate with the wheels. As will be seen in FIG. 4, the fixed axle housing 44 is provided with suitable saddles 44a, which are welded as at 45, to the lower leg portions of the tubular frame members 18 and 19.

Figure 5:
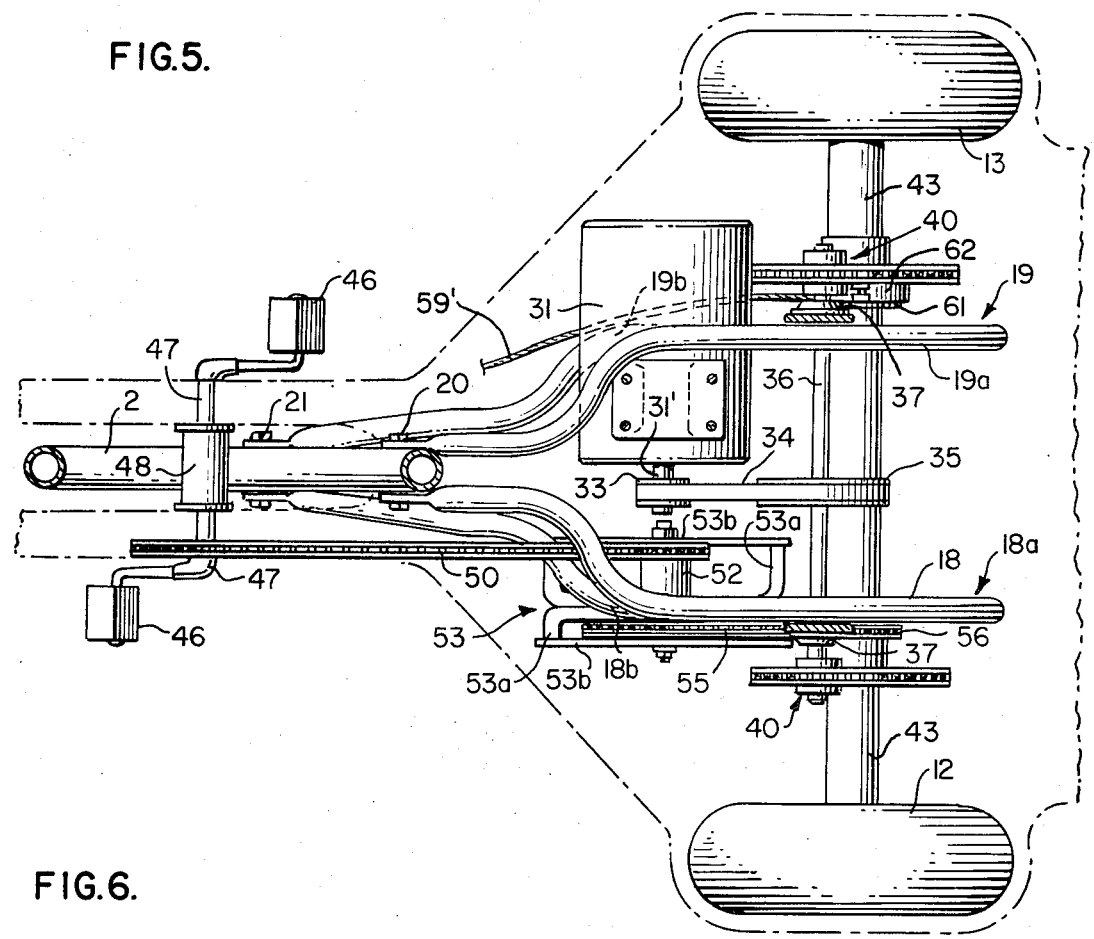
FIG. 5 is a view taken along line 5—5 of FIG. 3.

Referring to FIG. 5, in the operation of the vehicle thus far described, it will be readily apparent that when the motor 31 is energized, shaft 36 is caused to rotate by means of pulley 33, belt 34 and pulley 35. The rotation of shaft 36 is transmitted to each end portion of the vehicle axle through sprocket assemblies 40, chains 41 and sprockets 42, FIG. 4, whereby the vehicle may be propelled.

An important feature of the present invention is the provision of a pedalling assembly, together with the motor drive assembly, to thereby provide a dual power system which is adapted to operate conjointly as a source of power, or as independent power sources, at the option of the user. In order to accomplish this, the vehicle of the present invention is provided with the conventional bicycle pedals 46, FIGS. 3 and 5, connected to the ends of crank arms 47 journaled in a hub 48 secured to the frame 2. A sprocket 49 is secured to one of the crank arms for driving a chain 50 which drives a sprocket 51 connected to one end of a coaster-brake hub 52, mounted on a sub-frame assembly 53, including arms 53a which are welded to the lower leg portion 18b and end plates 53b having slots 53c for adjustably receiving the coaster brake axle, whereby the tension of the chain 50 may be adjusted. The opposite end of the coaster-brake hub 52 is also provided with a sprocket 54 for driving a chain 55, which in turn, drives a sprocket 56.

With reference to the conjoint operation of the pedalling assembly and the motor drive assembly, it will be understood that the pedal drive assembly is constructed and arranged whereby, when operating conjointly with the motor drive assembly that the driving ratio between the assemblies is such that the pedals rotate at a moderate speed when the vehicle is moving at maximum speed, thus enabling the operator to vary the pedalling speed, without having his feet accelerate at a rapid pace, in order to obtain the desired amount of exercise.

From the above description, it will be readily apparent that when the user pedals the vehicle, the drive which is imparted to sprocket 49, chain 50, and sprocket 51 on one end of the coaster-brake 52, is transmitted to sprocket 54 on the opposite end of the coaster brake, and then to chain 55 and sprocket 56 on the rear axle 43. When the pedalling assembly is employed as the sole source of power, the sprocket and clutch assemblies 40 prevent the drive from being transmitted back to shaft 36 and drive belt 34.

The clutch sprocket assemblies 40 function as a differential in that they both pull together if the vehicle is moving in a straight line. If the vehicle is turned to the right, the left wheel will have to rotate faster than the right wheel, and accordingly, the right wheel will do the pulling since the left wheel is overriding the clutch mechanism. The procedure is similar if the vehicle is turned to the left.

In addition to the coaster brake operatively associated with the rear left wheel 12 of the vehicle, hand-operated brake means are provided for braking the rear right wheel 13, said means comprising a conventional brake drum 61 secured to the sprocket 42, FIG. 4, and a brake band 62 supported in the operative position with respect to the drum. Actuation of the brake is accomplished by means of a Bowden wire 59' having one end connected to the free end portion of the brake band, the opposite end of the wire being connected to a lever 60', pivotally mounted on the handle bar. By depressing the pedal means 46 in a counterclockwise direction, the coaster brake assembly is actuated to "brake" the left wheel 12 of the vehicle; and when the hand-operated brake assembly is employed, the right wheel 13 is "braked," as described hereinabove. It will thus be seen that by means of the dual brake system, the rear wheels of the vehicle may be "braked" individually or simultaneously, depending upon the operational needs encountered during use of the vehicle.

Referring to FIGS. 3 and 7, a switch assembly designated generally by numeral 57, incorporating multiple contacts and an associated wiper arm, as well known in the art, is secured to the upper leg portion 18a and is provided with suitable leads 58 connected to the terminals of batteries 28 so as to provide multiple control of the voltage supplied the motor 31, to thereby control the speed of the motor, and thus the drive transmitted to the vehicle axle. The switch actuating means comprises a Bowden wire 59 having one end of its wire 59a, FIG. 7, connected to the switch actuator 57a, which is normally spring biased to the off or open position, the opposite end of the wire being connected to a lever 60 pivotally mounted on one of the handle bars 7, whereby when the user of the cart manually squeezes the lever in the direction of the grip member 7', the wire 59a is pulled outwardly causing the switch actuator 57a to move in a direction indicated by the arrow in FIG. 7, and thereby move the wiper arm of the switch assembly into desired contact with a selected contact of the switch, at the option of the user, thus closing a circuit from the battery or batteries to the motor.

By employing a 24 volt motor, and assuming that the batteries 28 are each of 12 volt capacity and connected in series, when the switch actuator 57a is moved to its first position, the motor would be connected in parallel with one of the batteries; thus only 12 volts are supplied to the motor which will then be running at a reduced speed. Accordingly, a moderate start of the vehicle is effected without any forward surge. If additional speed is desired, the switch actuator 57a is moved to a second position wherein the motor will be in series with the batteries and thus connected to a 24 volt source, to thereby increase the speed thereof.

It will be appreciated that a 24 volt motor utilizing four 6 volt batteries connected in series will function to provide a moderate initial start of the vehicle and a progressive increase in the speed thereof by connecting the motor in parallel with the first battery, then in series with the first two, then with the first three, and finally with all four of the batteries.

When the dual power system is employed to propel the vehicle of the present invention, the user first starts the vehicle by pedalling; switch 57 is then closed whereby the batteries energize the motor, the power of the motor and of the pedal assembly is then transmitted to the rear axle of the vehicle as described hereinabove. The switch 57 is constructed and arranged to provide multiple control of the voltage being fed from the batteries to the motor to control the speed thereof, and thus, the amount of drive transmitted to the vehicle axle.

When the dual power system is employed, the vehicle is started by means of the pedals; the switch 57 is then closed to energize the motor, and the combined power of the motor and the pedalling assembly is transmitted to the rear axle of the vehicle. The amount of energy conserved by starting the vehicle with the pedal means and pedalling at intervals after the motor has been energized, is substantially equivalent to converting the mechanical energy developed by pedalling into electrical energy and returning it to the battery.

Since the battery or batteries require recharging at various intervals, depending upon the nature and period of use of the vehicle, it will be understood that the batteries will be equipped with suitable connectors adapted for engagement with the terminals of the leads associated with a battery charging device.

While the power system of the present invention has been described as employing an electric motor and a pedalling assembly, it is contemplated that an internal combustion engine provided with suitable controls may be substituted for the electric motor since the sprocket and chain drive would remain unchanged. The output shaft of the engine would drive the belt 34, and a gasoline tank could occupy the position under the housing 9 where the batteries are disposed.

We claim:

1. In a dual powered vehicle having running gear including a frame and front wheel means and a pair of driven axles, each axle connected to a respective rear wheel, the improvement comprising, motor means mounted on the vehicle frame, first drive means connected between said motor means and the vehicle rear axles, a pedalling assembly mounted on the vehicle frame, second drive means connected between said pedalling assembly and the vehicle rear axles, each of said drive means incorporating a sprocket assembly including clutch means constructed and arranged, whereby when the pedalling assembly is employed as the sole source of power, the motor drive means is idle; and manual control means operatively connected to said motor means, whereby the motor means and the pedalling assembly may operate conjointly as a source of power, or as separate sources of power at the option of the user.

2. In a dual powered vehicle according to claim 1, wherein the motor means comprises an electric motor and battery means mounted on the vehicle frame and connected to the electric motor; the control means comprises switch means connected in the circuit between the battery means and the electric motor, said switch means being constructed and arranged to provide multiple control of the voltage supplied from the battery means to the motor, whereby to control the speed of the motor, and concomitant amount of drive transmitted to the vehicle axle.

3. In a dual powered vehicle having running gear including a frame and front wheel means and driven axle means connected to a pair of rear wheel means, the improvement comprising, motor means mounted on the vehicle frame, first drive means connected between said motor means and the vehicle rear axle means, said first drive means comprising, a shaft journaled in the vehicle frame and positioned above and parallel to the vehicle rear axle, a pulley secured to the medial portion of said shaft, a drive belt connected between said pulley and the motor means, a sprocket assembly connected to each end portion of said shaft, a pair of sprockets secured to the vehicle rear axle means and aligned with a respective sprocket assembly on the shaft, and a chain connected between each sprocket assembly on the shaft and its corresponding sprocket on the axle; a pedalling assembly mounted on the vehicle frame, second drive means connected between said pedalling assembly and the vehicle rear axle means, each of said drive means incorporating a sprocket assembly including a clutch means constructed and arranged, whereby when the pedalling assembly is employed as the sole source of power, the motor drive means is idle, and control means operatively connected to said motor means, whereby the motor means and the pedalling assembly may operate conjointly as a source of power, or as independent power sources at the option of the user.

4. In a dual powered vehicle having running gear including a frame and front wheel means and driven axle means connected to a pair of rear wheel means, the improvement comprising, motor means mounted on the vehicle frame, first drive means connected between said motor means and the vehicle rear axle means, a pedalling assembly mounted on the vehicle frame, second drive means connected between said pedalling assembly and the vehicle rear axle means, said second drive means comprising a coaster brake hub connected to the vehicle frame, a sprocket connected to one end of said coaster brake hub, a pedal-crank arm-sprocket assembly connected to the vehicle frame, a chain connected between said pedal-crank arm-sprocket assembly and the sprocket on said one end of said coaster brake, another sprocket secured to the opposite end of said coaster brake hub, a sprocket secured to the vehicle rear axle means and a chain connected between said another sprocket on the coaster brake hub and the sprocket secured to the rear axle means; each of said drive means incorporating a sprocket assembly including a clutch means constructed and arranged, whereby when the pedalling assembly is employed as the sole source of power, the motor drive means is idle, and control means operatively connected to said motor means, whereby the motor means and the pedalling assembly may operate conjointly as a source of power, or as independent power sources at the option of the user.

5. In a dual powered vehicle having running gear, including a frame and steerable front wheel means and driven axle means connected to a pair of rear wheel means, the improvement comprising, motor means mounted on the vehicle frame, drive means connected between said motor means and the vehicle rear axle means, a pedalling assembly mounted on the vehicle frame, drive means connected between said pedalling assembly and said rear axle means, and control means operatively connected to said motor means, whereby the motor means and pedalling assembly are adapted to operate conjointly as a source of power, or as independent power sources, at the option of the user; said vehicle frame including a pair of tubular frame members bent back upon themselves to form a pair of upper, spaced, parallel leg portions and a corresponding pair of lower leg portions, said upper leg portions being interposed a pair of upper and lower horizontally disposed plates, bolt means extending between said plates to fixedly secure said plates to the leg portions, said motor means being connected to said lower plate, and a source of energy for said motor means being supported on the upper plate.

6. In a dual powered vehicle according to claim 5, wherein the vehicle axle housing and the drive means between the pedalling assembly and vehicle rear axle means are connected to the lower leg portions.

7. In a dual powered vehicle having running gear, including a frame and steerable front wheel means and driven axle means connected to a pair of rear wheel means, the improvement comprising, motor means mounted on the vehicle frame, drive means connected between said motor means and the vehicle rear axle means, a pedalling assembly mounted on the vehicle frame, drive means connected between said pedalling assembly and said rear axle means, control means operatively connected to said motor means, whereby the motor means and pedalling assembly are adapted to operate conjointly as a source of power, or as independent power sources, at the option of the user; and a truncated housing secured to the vehicle frame for enclosing the motor means, source of energy for said motor means, drive means and rear axle, the rear wall of said housing having a recessed portion for carrying articles, and the front wall portion of the housing having a forwardly flared portion terminating in a horizontal surface for supporting the feet of the user of the vehicle.

8. In a dual powered vehicle having running gear, including a frame and steerable front wheel means and driven axle means connected to a pair of rear wheel means, the improvement comprising, motor means mounted on the vehicle frame, drive means connected between said motor means and the vehicle rear axle means, said drive means comprising, a shaft journaled in the vehicle frame and positioned above and parallel to the vehicle rear axle means, a pulley secured to the medial portion of said shaft, a drive belt connected between said pulley and the motor means, a sprocket assembly connected to each end portion of said shaft, a pair of sprockets secured to the vehicle rear axle means and aligned with a respective sprocket assembly on the shaft, and a chain connected between each sprocket assembly on the shaft and its corresponding sprocket on the axle means; a pedalling assembly mounted on the vehicle frame, drive means connected between said pedalling assembly and said rear axle means, control means operatively connected to said motor means, whereby the motor means and pedalling assembly are adapted to operate conjointly as a source of power, or as independent power sources, at the option of the user; and hand-operated brake means operatively connected to one of the sprockets on the vehicle rear axle means.

* * * * *